(12) United States Patent
Biesecker et al.

(10) Patent No.: US 7,359,151 B1
(45) Date of Patent: Apr. 15, 2008

(54) MAGNETIC HEAD HAVING WRITER WITH EMBEDDED WRITE GAP BETWEEN WEAR-RESISTANT POLE TIP LAYERS

(75) Inventors: John P. Biesecker, Boulder, CO (US); Larry E. Daby, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 405 days.

(21) Appl. No.: 11/094,703

(22) Filed: Mar. 30, 2005

(51) Int. Cl.
*G11B 5/31* (2006.01)

(52) U.S. Cl. ..................................... 360/126
(58) Field of Classification Search ............... 360/126, 360/125, 122, 119, 120, 317
See application file for complete search history.

(56) References Cited

U.S. PATENT DOCUMENTS

| | | | | |
|---|---|---|---|---|
| 5,473,491 | A * | 12/1995 | Fujisawa et al. | 360/126 |
| 5,543,989 | A * | 8/1996 | Westwood | 360/319 |
| 5,572,392 | A * | 11/1996 | Aboaf et al. | 360/126 |
| 5,751,526 | A * | 5/1998 | Schemmel | 360/317 |
| 6,038,106 | A * | 3/2000 | Aboaf et al. | 360/317 |
| 6,038,110 | A * | 3/2000 | Aboaf et al. | 360/126 |
| 6,169,642 | B1 * | 1/2001 | Mino et al. | 360/126 |
| 6,172,848 | B1 * | 1/2001 | Santini | 360/126 |
| 6,188,544 | B1 * | 2/2001 | Mino | 360/126 |
| 6,495,311 | B1 * | 12/2002 | Khan et al. | 430/313 |
| 6,563,669 | B1 | 5/2003 | Daby et al. | |
| 6,603,637 | B1 * | 8/2003 | Segar et al. | 360/122 |
| 6,683,749 | B2 | 1/2004 | Daby et al. | |
| 6,710,967 | B2 * | 3/2004 | Hennecken et al. | 360/77.12 |
| 6,724,572 | B1 * | 4/2004 | Stoev et al. | 360/126 |
| 6,778,358 | B1 * | 8/2004 | Jiang et al. | 360/126 |
| 6,826,020 | B2 | 11/2004 | Daby et al. | |
| 7,177,117 | B1 * | 2/2007 | Jiang et al. | 360/126 |
| 2002/0105757 | A1 * | 8/2002 | Oki et al. | 360/126 |
| 2004/0136118 | A1 * | 7/2004 | Biskeborn | 360/317 |

FOREIGN PATENT DOCUMENTS

| | | | |
|---|---|---|---|
| JP | 03280206 A | * | 12/1991 |
| JP | 06243426 A | * | 9/1994 |

* cited by examiner

*Primary Examiner*—Craig A. Renner
(74) *Attorney, Agent, or Firm*—Brooks Kushman P.C.

(57) ABSTRACT

A method of fabricating a magnetic writer includes depositing a wear-resistant bottom pole tip layer on a bottom pole; depositing a write gap layer on the bottom pole tip layer; and depositing a wear-resistant top pole tip layer on the write gap layer. The layers are patterned such that the write gap layer and the top pole tip layer each have a track width facing a media surface and the write gap layer and the top pole tip layer each have the same length equal to a throat height between the media surface and a zero throat location. The bottom pole tip layer and the bottom pole are patterned such that the bottom pole tip layer has the track width facing the media surface and the bottom pole has a bottom pole tip at the media surface with the bottom pole tip having the track width facing the media surface.

11 Claims, 2 Drawing Sheets

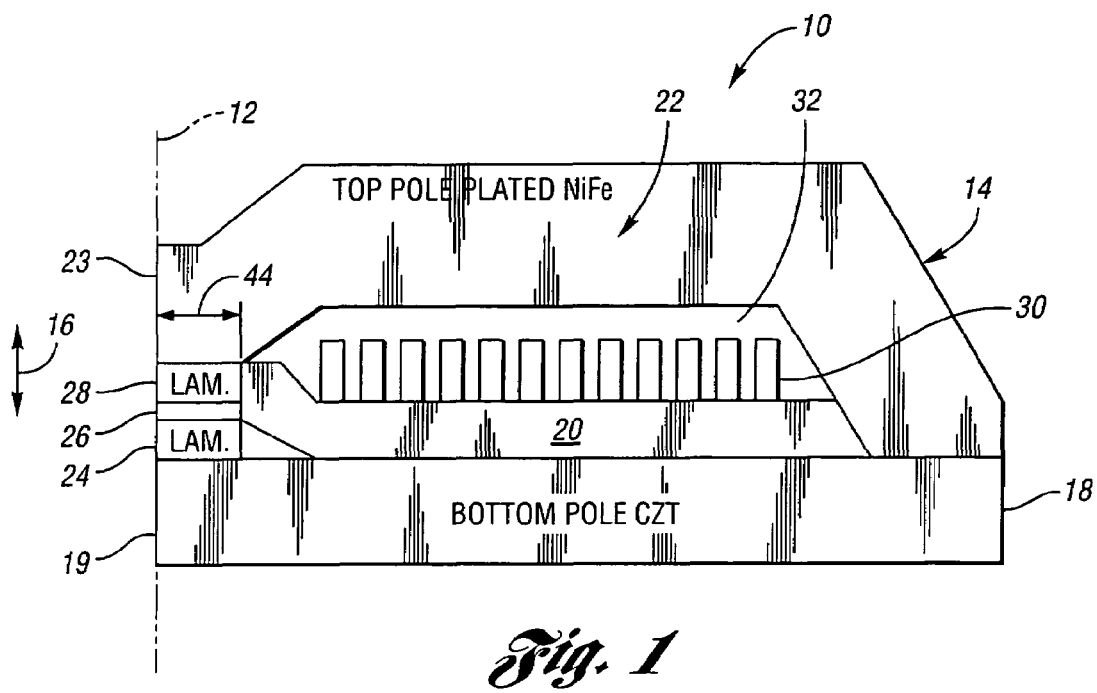
*Fig. 1*
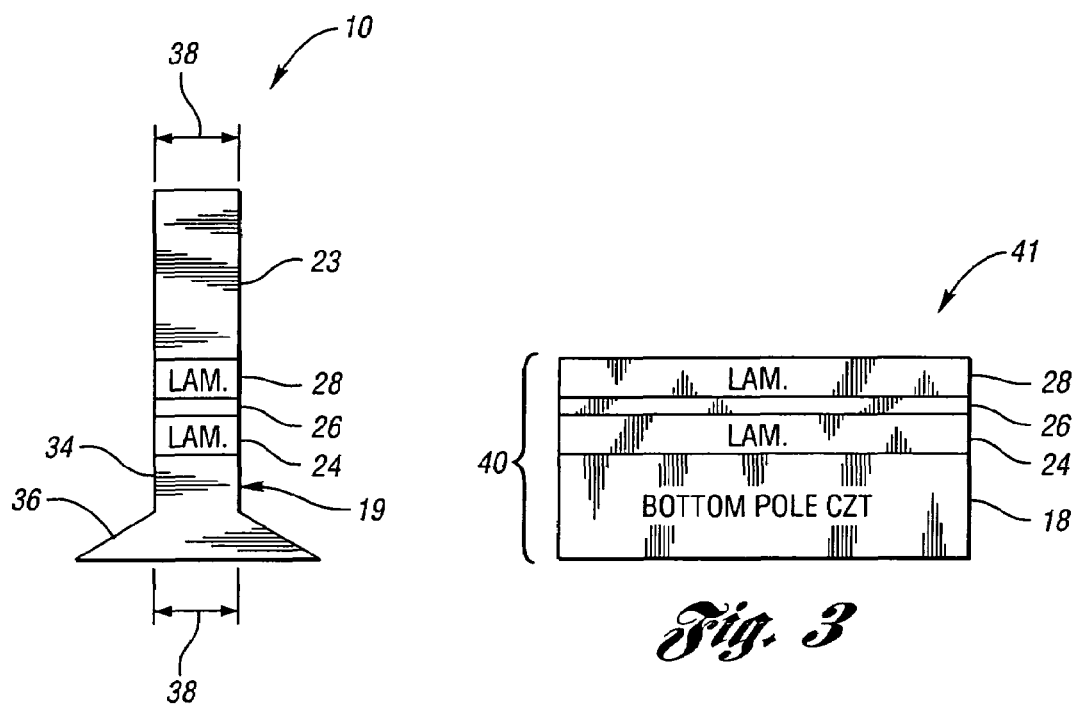
*Fig. 2*
*Fig. 3*

MAGNETIC HEAD HAVING WRITER WITH EMBEDDED WRITE GAP BETWEEN WEAR-RESISTANT POLE TIP LAYERS

BACKGROUND OF THE INVENTION

1. Field of the Invention

The present invention relates to a magnetic head having a writer with an embedded write gap and also relates to a method of fabricating such a magnetic head.

2. Background Art

A magnetic head includes a writer for writing data onto magnetic storage media such as magnetic tape or any other removable magnetic media. The writer generally includes top and bottom magnetic poles. The poles have tips which sandwich a write gap insulator at a media bearing surface. The poles generate magnetic flux for recording magnetic transitions into media positioned at the media bearing surface to write data onto the media.

Narrow track widths in media are being increasingly used to increase the amount of data that can be recorded. A narrow track width requires tight control of the dimension and shape of the pole tips at and near the write gap. The pole tip width of the trailing pole (i.e., the top pole tip or the bottom pole tip dependent on the direction of motion of the media at the media bearing surface) determines the track width of the writer.

As the track width becomes smaller, the problem of (i) defining narrow pole tips while (ii) incorporating highly wear-resistant materials at the media bearing surface becomes significantly more difficult. Consequently, the pole tip definition process, commonly done at the top pole level, becomes progressively more difficult as the pole tip widths narrow. Further, as the pole tip definition process is near the end of the writer fabrication sequence, this process is more costly if a processing error occurs.

In general, the ability to control pole tip width is an issue as the dimensions on the writer become smaller. Wear resistance is also an issue for magnetic heads, especially, helical scan magnetic tape heads.

SUMMARY OF THE INVENTION

Accordingly, it is an object of the present invention to provide a magnetic head having a writer with an embedded write gap.

It is another object of the present invention to provide a method for fabricating a magnetic head having a writer with an embedded write gap.

It is a further object of the present invention to provide a magnetic head fabrication method which employs a serial sequence of wear-resistant bottom pole tip deposition, write gap deposition, and wear-resistant top pole tip deposition.

It is another object of the present invention to provide a magnetic head fabrication method which employs the above-noted serial deposition sequence followed by a two-stage ion mill process which defines the zero throat location and the dimensions of the pole tips and the bottom pole body.

It is still a further object of the present invention to provide a magnetic head fabrication method which employs the above-noted serial deposition followed by a first milling process which defines the zero throat and the track width followed by a second milling process which defines the track width and the bottom pole.

It is still yet another object of the present invention to provide a magnetic head having at a media bearing surface the serial sequence of an inverted bottom pole, a wear-resistant bottom pole tip layer, an embedded write gap layer, a wear-resistant top pole tip layer, and a top pole.

In carrying out the above objects and other objects, the present invention provides a writer for a magnetic head. The writer includes a bottom pole tip, a wear-resistant bottom pole tip layer, a write gap layer, a wear-resistant top pole tip layer, and a top pole tip. The wear-resistant bottom pole tip layer is formed on and is part of the bottom pole tip. The write gap layer is embedded between the wear-resistant pole tip layers. The wear-resistant top pole tip layer is formed under and is part of the top pole tip.

The wear-resistant pole tip layers and the write gap layer each have the same width facing a media bearing surface. This width defines a track width. The bottom and top pole tips each have a width facing the media bearing surface substantially equal to the track width.

The bottom pole tip may include an upper bottom pole portion and a lower bottom pole portion in which the bottom pole portions have respective widths facing a media bearing surface. The width of the upper bottom pole portion is substantially equal to the track width. The width of the lower bottom pole portion is greater than the track width. In this case, the wear-resistant bottom pole tip layer is formed on the upper bottom pole portion. The widths of the upper bottom pole portion, the wear-resistant pole tip layers, the write gap layer, and the top pole tip may be vertically aligned at the media bearing surface.

The wear-resistant top pole tip layer and the write gap layer each have substantially the same length between the media bearing surface and a zero throat location. This length defines a throat height.

Preferably, the bottom pole tip includes CZT, the wear-resistant pole tip layers are nitride wear-resistant layers each including either NiFe/FeN or CZT/FeN laminates, the write gap layer includes alumina, and the top pole tip includes plated NiFe.

Further, in carrying out the above objects and other objects, the present invention provides a method of fabricating the writer. The method includes depositing a wear-resistant bottom pole tip layer on a bottom pole layer, followed by depositing a write gap layer on the wear-resistant bottom pole tip layer, and followed by depositing a wear-resistant top pole tip layer on the write gap layer.

The wear-resistant pole tip layers and the write gap layer are then selectively patterned (using ion milling or the like) to define a zero throat location and a track width such that the write gap layer and the wear-resistant top pole tip layer each have a width facing a media bearing surface substantially equal to the track width, and such that the write gap layer and the wear-resistant top pole tip layer each have the same length equal to a throat height between the media bearing surface and the zero throat location.

The wear-resistant bottom pole tip layer and the bottom pole layer are then selectively patterned (using ion milling or the like) such that the wear-resistant bottom pole tip layer has a width facing the media bearing surface substantially equal to the track width and such that the bottom pole layer has a bottom pole tip at the media bearing surface with the bottom pole tip having a width facing the media bearing surface substantially equal to the track width.

Patterning the wear-resistant bottom pole tip layer and the bottom pole layer may further include patterning the bottom pole layer such that the bottom pole tip includes an upper bottom pole portion formed under the wear-resistant bottom pole tip layer and a lower bottom pole portion with the upper bottom pole portion having a width facing the media bearing surface substantially equal to the track width and the lower bottom pole portion having a width facing the media bearing surface greater than the track width.

The method also includes depositing a top pole tip on the wear-resistant top pole tip layer such that the top pole tip has a width facing the media bearing surface substantially equal to the track width.

BRIEF DESCRIPTION OF THE DRAWINGS

FIG. 1 illustrates a magnetic head in accordance with an embodiment of the present invention as seen perpendicular to a media bearing surface;

FIG. 2 illustrates the magnetic head shown in FIG. 1 as seen parallel to the media bearing surface;

FIG. 3 illustrates an initial deposition sequence on a wafer for forming the magnetic head;

DETAILED DESCRIPTION OF THE PREFERRED EMBODIMENT(S)

Figure 4:
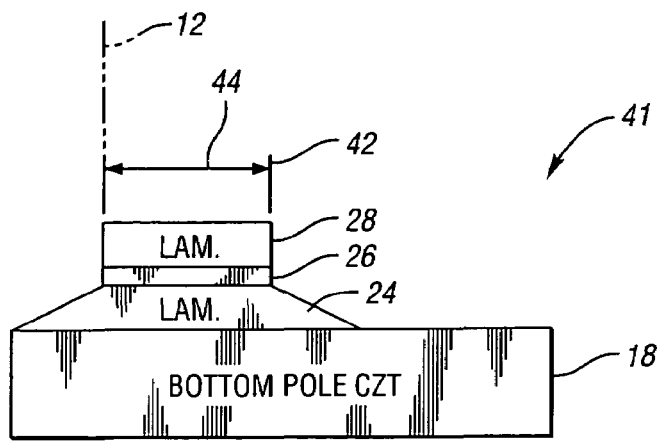
FIG. 4 illustrates a side view of the wafer after a first patterning process for forming the magnetic head.

Several terms are used in this specification in a generic sense. The term "forming" includes any combination of fabrication steps that result in the deposition and/or patterning of a layer. This includes depositing a layer followed by a subsequent patterning using a masking layer to control the removal of unwanted material. This also includes the deposition of a patterning mask used to control a subsequent deposition. The term "deposition" is any method of creating a layer of material over an existing surface. Deposition includes sputtering, evaporating, plating, chemical vapor deposition, and any other like methods known in the art. The term "patterning" is any method of defining a geometric area or areas where a layer will or will not exist, or will exist in a thinner form. Patterning includes wet chemical etching, electro-machining, lift-off techniques, ion milling, focused ion beams, and other like methods used in the art.

Referring now to FIGS. 1 and 2, a magnetic head 10 in accordance with an embodiment of the present invention is shown. FIG. 1 illustrates magnetic head 10 as seen perpendicular to a media bearing surface 12 and represents a final side view of the magnetic head. FIG. 2 illustrates magnetic head 10 as seen parallel to media bearing surface 12 and represents a final media surface bearing view of the magnetic head.

Magnetic head 10 includes an inductive-type writer 14 for writing data onto media (not shown) located at a media bearing surface 12. Writer 14 generates magnetic flux for recording magnetic transitions into media located at media bearing surface 12 in order to write data onto the media. Media moves in either direction 16 relative to magnetic head 10 for the magnetic head to write data along the length of the media.

Writer 14 generally includes a bottom pole 18 and a top pole 22. Bottom and top poles 18, 22 include magnetic materials. For example, bottom pole 18 includes CZT and top pole 22 includes plated NiFe (45/55 alloy). Bottom pole 18 includes a bottom pole tip 19 which is adjacent to media bearing surface 12. Similarly, top pole 22 includes a top pole tip 23 which is adjacent to media bearing surface 12.

At media bearing surface 12, writer 14 further includes a wear-resistant bottom pole tip layer 24, an embedded write gap layer 26, and a wear-resistant top pole tip layer 28. Wear-resistant pole tip layers 24, 28 are nitride wear layers made from, for example, NiFe/FeN or CZT/FeN laminates. Embedded write gap layer 26 is an insulator made from, for example, alumina.

At media bearing surface 12, top pole tip 23 is formed on and is part of wear-resistant top pole tip layer 28, the wear-resistant top pole tip layer is formed on embedded write gap layer 26, the embedded write gap layer is formed on wear-resistant bottom pole tip layer 24, and the wear-resistant bottom pole tip layer is formed on and is part of bottom pole tip 19. As such, at media bearing surface 12, embedded gap layer 26 separates wear-resistant bottom pole tip layer 24 and bottom pole tip 19 from wear-resistant top pole tip layer 28 and top pole tip 23. Thus, bottom pole 18 and top pole 22 are separated from one another at media bearing surface 12.

Writer 14 further includes a plurality of magnetic coils 30 which are insulated from one another by insulator layer 32. Magnetic coils 30 with insulator layer 32 are interposed between an insulator layer 20 and top pole 22. Insulator layer 20 isolates magnetic coils 30 from bottom pole 18. Top pole 22 contacts bottom pole 18 at a point away from media bearing surface 12 such that the bottom and top poles are magnetically coupled to one another. This magnetic coupling allows a magnetic flux return path between bottom and top poles 18, 22 to enable writer 14 to magnetically record data onto media.

In accordance with an embodiment of the present invention, bottom pole tip 19 has an inverted structure. To this end, bottom pole tip 19 includes an upper bottom pole portion 34 and a lower bottom pole portion 36. Wear-resistant bottom pole tip layer 24 is part of and formed on upper bottom pole portion 34. Upper bottom pole portion 34 has a width 38 at media bearing surface 12 which, as shown in FIG. 2, is smaller than the width of lower bottom pole portion 36. The differences in the widths of bottom pole portions 34, 36 give rise to the inverted structure of bottom pole tip 19. Top pole tip 23 also has width 38 at media bearing surface 12.

Wear-resistant pole tip layers 24, 28 and embedded write gap layer 26 have width 38 at media bearing surface 12. As such, width 38 defines the track width which provides the width of a recording track in media. Upper bottom pole portion 34, wear-resistant bottom pole tip layer 24, embedded write gap layer 26, wear-resistant top pole tip layer 28, and top pole tip 23 are vertically aligned with one another at media bearing surface 12 as shown in FIG. 2 such that track width 38 is maintained by all the writer elements at the media bearing surface.

A process for fabricating magnetic head 10 will now be described. Referring now to FIG. 3, with continual reference to FIGS. 1 and 2, an initial deposition sequence 40 on a wafer 41 for forming magnetic head 10 is shown. Deposition sequence 40 is a serial deposition sequence which includes: (i) a bottom pole material deposition for depositing a bottom pole layer 18; (ii) followed by a wear-resistant bottom pole tip deposition for depositing wear-resistant bottom pole tip layer 24 on bottom pole layer 18; (iii) followed by a write gap deposition for depositing write gap layer 26 on the wear-resistant bottom pole tip layer; (iv) followed by a wear-resistant top pole tip deposition for depositing wear-resistant top pole tip layer 28 on the embedded write gap layer.

Wafer 41 includes a wear layer (not shown) upon which bottom pole layer 18 is initially deposited. For example, the wear layer is a Ti wear layer having a thickness of about 1000 angstroms; and bottom pole layer 18 has a thickness of about 3.0 micrometers. As an example, wear-resistant pole tip layers 24, 28 each have a thickness of about 0.5 micrometers; and embedded write gap layer 26 has a thickness of about 0.28 micrometers.

Figure 5:
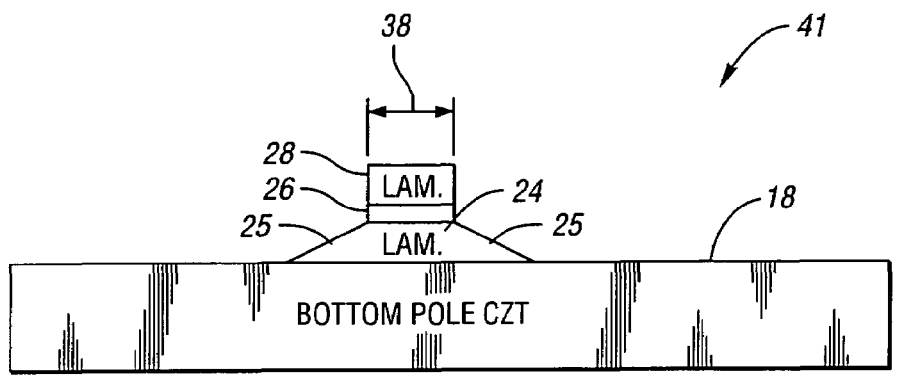
FIG. 5 illustrates a media bearing surface view of the wafer shown in FIG. 4 after the first patterning process.

Referring now to FIGS. 4 and 5, with continual reference to FIGS. 1 through 3, a first patterning process for fabricating magnetic head 10 will now be described. FIGS. 4 and 5 respectively illustrate side and media bearing surface views of wafer 41 after the first patterning process.

The first patterning process, preferably an ion milling process, is used to define a zero throat location 42 and track width 38. Zero throat location 42 is the location at the edge of insulator layer 32 closest to media bearing surface 12. Zero throat location 42 provides a reference point for a throat height of magnetic head 10. The throat height is a length (height) between media bearing surface 12 and zero throat location 42. That is, the throat height is the length of a magnetic pole between media bearing surface 12 and the edge of insulator layer 32 closest to the media bearing surface.

The first patterning process selectively etches wear-resistant pole tip layers 24, 28 and embedded gap layer 26 to leave wafer 41 in the condition shown in FIGS. 4 and 5. In this condition, embedded gap layer 26 and wear-resistant top pole tip layer 28 have (side) lengths equal to a throat height 44 between media bearing surface 12 and zero throat location 42 while wear-resistant bottom pole tip layer 24 has a (side) length greater than throat height 44 as shown in FIG. 4.

The first patterning process also selectively etches embedded write gap layer 26 and wear-resistant top pole tip layer 28 such that the embedded write gap layer and the wear-resistant top pole tip layer have a width equal to track width 38 at media bearing surface 12 as shown in FIG. 5. As shown in FIG. 5, wear-resistant bottom pole tip layer 24 has residue side portions 25 at media bearing surface 12 after the first patterning process. Thus, wear-resistant bottom pole tip layer 24 has a width greater than track width 38 at media bearing surface 12 after the first patterning process.

In sum, after the first patterning process, zero throat height 44 for write gap layer 26 and wear-resistant top pole tip layer 28 is defined as shown in FIG. 4; and track width 38 for embedded write gap layer 26 and wear-resistant top pole tip layer 28 is defined as shown in FIG. 5.

Figure 6:
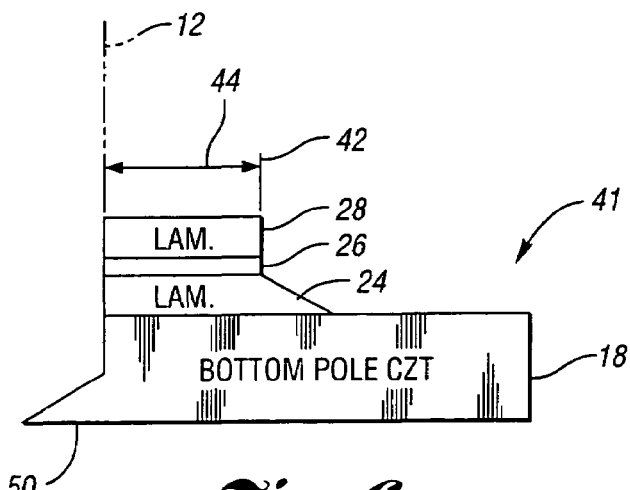
FIG. 6 illustrates a side view of the wafer after a second patterning process for forming the magnetic head.
Figure 7:
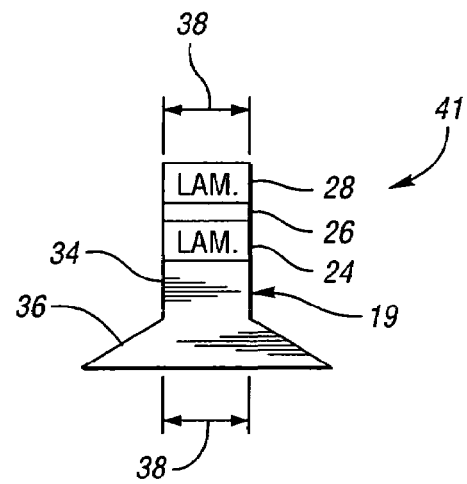
FIG. 7 illustrates a media bearing surface view of the wafer shown in FIG. 6 after the second patterning process.

Referring now to FIGS. 6 and 7, with continual reference to FIGS. 1 through 5, a second patterning process for fabricating magnetic head 10 will now be described. FIGS. 6 and 7 respectively illustrate side media bearing surface views of wafer 41 after the second patterning process.

The second patterning process, preferably an ion milling process, is used to define track width 38 for wear-resistant bottom pole tip layer 24 and bottom pole tip 19. This second patterning process is also used to define the inverted structure of bottom pole tip 19. The second patterning process etches away residue side portions 25 of wear-resistant bottom pole tip layer 24 and selectively etches bottom pole 18 to leave wafer 41 in the condition shown in FIG. 6. Consequently, wear-resistant pole tip layers 24, 28 and embedded write gap layer 26 have a length equal to throat height 44 between media bearing surface 12 and zero throat location 42.

The second patterning process etches away residue side portions 25 of wear-resistant bottom pole tip layer 24 such that this layer has a width equal to track width 38 at media bearing surface 12 as shown in FIG. 7. As such, after the second patterning process, track width 38 for wear-resistant bottom pole tip layer 24 is defined as shown in FIG. 7.

The second patterning process etches bottom pole 18 to form upper bottom pole portion 34 and lower bottom pole portion 36 of bottom pole tip 19. This gives rise to the inverted structure of bottom pole tip 19. The second patterning process etches bottom pole tip 19 such that upper bottom pole portion 34 has a width equal to track width 38 facing media bearing surface 12. As such, after the second patterning process, track width 38 for upper bottom pole portion 34 of bottom pole tip 19 is defined as shown in FIG. 7.

Thus, as a result of the first and second patterning processes in accordance with the present invention, the critical dimensions of writer 14 are defined early in the fabrication process and on a planar surface where dimensional control is optimal.

Subsequent to the second patterning process, the process for fabricating magnetic head 10 further includes standard processes for the remainder of writer 14. These standard processes end with a simple etch or plated process for top pole 22 where the dimensions of top pole tip 23 are equal to or slightly less than the previously defined upper bottom pole portion 34 of bottom pole tip 19. After top pole 22 is plated, there is no final (SST) mill process required. Wafer 41 is then lapped to lap away foot 50 of bottom pole 18 shown in FIG. 6. The lapping may also lap away edge portions of bottom pole 18, wear-resistant pole tip layers 24, 28, and embedded gap layer 26 to further define media bearing surface 12 and zero throat height 44.

Thus, it is apparent that there has been provided, in accordance with the present invention, a magnetic head having a writer with an embedded write gap and a method of fabricating such a magnetic head that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A writer for a magnetic head, the writer comprising:
   a bottom pole tip including cobalt-zirconium-tantalum (CZT);
   a nitride wear-resistant bottom pole tip layer including either NiFe/FeN or CZT/FeN laminates formed on and part of the bottom pole tip;
   a nitride wear-resistant top pole tip layer including either NiFe/FeN or CZT/FeN laminates;
   a write gap layer embedded between the wear-resistant pole tip layers; and
   a plated NiFe top pole tip formed on and part of the wear-resistant top pole tip layer.

2. The writer of claim 1 wherein:
   the wear-resistant pole tip layers and the write gap layer each have the same width facing a media bearing surface, the width defining a track width.

3. The writer of claim 2 wherein:

the bottom and top pole tips each have a width substantially equal to the track width facing the media bearing surface.

4. The writer of claim 3 wherein:

the bottom pole tip has an upper bottom pole portion and a lower bottom pole portion, the bottom pole portions having respective widths facing the media bearing surface, the width of the upper bottom pole portion being substantially equal to the track width, the width of the lower bottom pole portion being greater than the track width.

5. The writer of claim 4 wherein:

the wear-resistant bottom pole tip layer is formed on and is part of the upper bottom pole portion.

6. The writer of claim 5 wherein:

the widths of the upper bottom pole portion, the wear-resistant pole tip layers, the write gap layer, and the top pole tip are vertically aligned at the media bearing surface.

7. The writer of claim 6 wherein:

the wear-resistant pole tip layers and the write gap layer each have substantially the same length between the media bearing surface and a zero throat location, the length defining a throat height.

8. The writer of claim 2 wherein:

the wear-resistant top pole tip layer and the write gap layer each have substantially the same length between the media bearing surface and a zero throat location, the length defining a throat height.

9. A writer for a magnetic head, the writer comprising:

a bottom pole tip including cobalt-zirconium-tantalum (CZT);

a nitride wear-resistant bottom pole tip layer including either NiFe/FeN or CZT/FeN laminates formed on the bottom pole tip;

a nitride wear-resistant top pole tip layer including either NiFe/FeN or CZT/FeN laminates;

a write gap layer embedded between the wear-resistant pole tip layers; and a plated NiFe top pole tip formed on the wear-resistant top pole tip layer;

wherein the wear-resistant pole tip layers and the write gap layer each have the same width facing a media bearing surface, the width defining a track width;

wherein the wear-resistant pole tip layers and the write gap layer each have substantially the same throat height between the media bearing surface and a zero throat location.

10. The writer of claim 9 wherein:

the bottom pole tip has an upper bottom pole portion and a lower bottom pole portion, the bottom pole portions having respective widths facing the media bearing surface, the width of the upper bottom pole portion being substantially equal to the track width, the width of the lower bottom pole portion being greater than the track width.

11. The writer of claim 10 wherein:

the widths of the upper bottom pole portion of the bottom pole tip, the wear-resistant pole tip layers, the write gap layer, and the top pole tip are vertically aligned respectively at the media bearing surface.

* * * * *